2,786,765

TOPPING CONCENTRATE AND METHOD OF MAKING THE SAME

Richard H. Prince, New York, N. Y.

No Drawing. Application May 9, 1955, Serial No. 507,161

7 Claims. (Cl. 99—139)

This invention relates to concentrates for use in the baking and related arts. More specifically the invention concerns a food product in concentrated form adapted to be mixed with water and whipped to provide fillings or toppings for cakes or the like, and voluminous whipped cream products.

It has been proposed to beat shortenings to provide a whipped product with an increase of volume of as much as 300%. However, it is desirable that such whipped shortenings have a sugar content, which is usually in the form of a sugar syrup. The addition of the sugar materially decreases the maximum expansion of the starting material, and such expansion may be no more than about 50%. Such products which may have a butter base plus some eggs and milk, are quite satisfactory when manufactured for immediate use as in bakeries or the like; but with the limited amount of expansion, do not lend themselves to packaging for use at a later date.

Fresh dairy cream will provide whipped products with an increase in volume of as much as 200% providing the cream is carefully stored at optimum temperatures and is whipped by a skilled operator. However, the high cost of cream, the low expansion factor and perishability, severely limits the commercial utilization of this type of whipped product.

Hardened fats have also been used to make whipped cream products with an expansion of as much as 350%, such creams being of the fat-in-water type and free of protein. However, with such products there is a possibility of growth of microorganisms with a resultant chemical breakdown of the fats to bad tasting fatty acids which would impair the whipped product.

It has been found that an improved concentrate derived from hardened fats may be formed when such fat is emulsified in an aqueous solution of sugar using a non-ionic and an ionic emulsifier. Such a product has a substantial shelf life even at warm temperatures and which is biologically stable. The product may be mixed with water in varying proportions to allow the same to be whipped into a cream filling or topping for cakes or the like, or may be whipped under conditions giving an expansion of as much as 500%. With such an expansion ratio, the concentrate may be readily packaged for sale under economically desirable conditions.

Thus, water which is inherently shoft, or is chemically softened if necessary, is mixed with pure stearic acid and sodium hydroxide to form sodium stearate in situ, warmed to a temperature of about 170° F. and sugar is added to form a sugar syrup which is brought down to a temperature of about 150° F. To the syrup there is then added a mixture of a hardened fat such as palm kernel fat and a non-ionic emulsifier such as Span 60 which is a waxy solid sorbitan monostearate. Flavoring agents are added and the mixture is stirred without foaming while cooling the same to about 130° F. The mixture is homogenized at about 150 to 200 atmospheric.

The resultant product may be kept at temperatures between 50° and 75° F. in liquid form which is readily dispersible in water. If the product is brought down to a temperature of between about 30° and 40° F. and stirred, stiffening will take place, allowing the same to be packaged in suitable wrappers.

The following example illustrates the invention:

*Example*

In a jacket tank fitted with a stirrer, there is placed 233 pounds of zero soft or softened water. Sodium stearate is formed in situ by dissolving in the water 225 grams of pure stearic acid and 53 grams of sodium hydroxide, the water being heated to about 170° while stirring. To the solution there is added 467 pounds of sugar which is melted in, bringing the temperature of the resultant syrup to about 150° F.

To the sugar syrup there is added 300 pounds of hardened palm kernel fat which has a melting point of 37–39° C. and 18.5 pounds of Span 60 which is a non-ionic emulsifier and corresponds to a sorbitan monostearate, the emulsifier being melted in the fat. There is also added about 40 ounces of vanilla essence and a small amount of cream flavoring or the like. Stirring is continued without foaming while the temperature is reduced to about 130° F. The mixture is then homogenized at about 200 pounds pressure. The resultant emulsion, while still fluid, can be tanked and packed and allowed to attain room temperature.

It is important that the water used be quite soft so as to avoid precipitation of insoluble stearates. Other hardened fats such as groundnut and the like, may be used in lieu of the palm kernel fat. Soya and peanut oils, brought to a hardened condition also may be used to give a concentrate capable of forming a firm whipped cream.

The sugar syrup used has a ratio of sugar to water of 2:1 by weight. The hardened fat may be used in the ratio of from 2.5 to 3.5 parts thereof by weight to 7 parts of syrup by weight. The homogenizing pressure may be varied between 150 to 200 pounds.

The emulsion may be kept at temperatures between 50 and 75° F. in a fluid condition and may be dispersed in water for many months after manufacture. If the concentrate is cooled to between 30° F. and 40° F. and stirred while still cold, the base concentrate will stiffen. It has been found that the concentrate of the instant invention is not unduly sensitive to temperature changes while in storage and may be kept on the shelf for extended periods of time without deterioration.

An excellent topping, filling and the like may be made by combining 6 ounces of concentrate with 1 or 2 ounces of water. Whipping the combination at top speed for about 2 or 3 minutes will provide a strong whip which may also be piped as a decoration on cakes and the like. If 3 ounces of water is combined with 6 ounces of the concentrate and whipped at top speed, a voluminous whipped cream will be formed with an expansion of as much as 500% in volume. Thus, the concentrate may be packaged in small quantities to give a substantial increase in volume of the resultant whipped cream when a maximum amount of water is added to the concentrate.

It is understood that other non-ionic emulsifiers which are edible, may be used in lieu of the sorbitan monostearate. The stearic acid used should be of the highest purity to insure optimum results.

It will thus be seen that there has been provided an improved topping concentrate for use in connection with the food and confectionery industries, and a method of making the same, in which the several objects of the invention are attained and which is well adapted to meet commercial needs.

Since variations may be made in the embodiment of the invention described herein without departing from the spirit thereof, it is understood that the example given herein is to be deemed illustrative and not by way of limitation.

Having thus disclosed my invention, I claim as new and desire to protect by Letters Patent:

1. An edible, stable concentrate consisting of an emulsion adapted to have water added thereto and whipped to incorporate air therein with an increase in volume of up to about 500% and comprising by weight about 30% of a hardened fat, about 70% of a syrup containing sugar and water in the ratio by weight of about 2:1, an ionic emulsifier comprising sodium stearate and an edible nonionic emulsifier comprising sorbitan monosterate.

2. An edible, stable concentrate consisting of an emulsion adapted to have selected amounts of water added thereto and whipped to incorporate air therein with an increase in volume of from about 200% to about 500% and comprising by weight about 300 parts of hardened palm kernel oil, about 700 parts of syrup containing sugar and water in the ratio of 2:1, about 18½ parts of sorbitan monosterate, and about ½ part sodium stearate.

3. An edible, stable concentrate consisting of a fat in sugar syrup emulsion wherein the aqueous phase contains about 2 parts by weight of sugar to about 1 part by weight of water, and including about 3 parts by weight of a hardened fat to about 7 parts by weight of syrup, a small amount of sodium stearate, sorbitan monostearate in an amount by weight of about 5% to about 7% of the hardened fat, and a small amount of flavoring.

4. The method of making an edible, stable concentrate to be used in making whipped, aerated cake fillings and whipped creams comprising mixing water of substantially zero hardness with a small amount of sodium stearate at a temperature of about 170° F., adding sugar to the water in the ratio of about 2 parts of sugar by weight to 1 part water by weight, continuing stirring to a temperature of about 150° F., incorporating hardened palm kernel fat in the ratio of about 3 parts by weight of fat to about 7 parts by weight of sugar syrup, said fat including about 5% to about 7% by weight of sorbitan monostearate, stir while cooling to about 130° F. and homogenizing at about 150 to about 200 pounds pressure.

5. The method of making an edible, stable concentrate to be combined with selected amounts of water and whipped to form creams having an expansion up to about 500% of the volume of said concentrate comprising forming a sugar syrup containing about 2 parts by weight of sugar to 1 part by weight of water including a small amount of sodium stearate, adding to the syrup a hardened fat in the proportion of about 3 parts by weight of fat to about 7 parts by weight of syrup and an edible, nonionic emulsifier comprising sorbitan monostearate amounting to about 6% by weight of said fat, and a small amount of flavoring, stirring the mixture and homogenizing to form a stable emulsion.

6. The method of making an edible, stable concentrate to be combined with water and whipped to form creams having an expansion up to about 500% of the volume of the concentrate comprising mixing a small amount of sodium stearate with soft water and adding sugar to form a syrup with a ratio of about 2 parts by weight of sugar to 1 part by weight of water, adding to the syrup hardened fat in the proportion of about 250–350 parts by weight of fat to about 700 parts by weight of syrup and about 1 part by weight of sorbitan monostearate to about 15 parts by weight of fat, stirring the mixture at about 130° F. and homogenizing to form a stable emulsion.

7. The method of claim 6 and further including cooling the emulsion to between 30° and 40° F. and stirring to form a stiffened base.

References Cited in the file of this patent
UNITED STATES PATENTS

| | | |
|---|---|---|
| 1,553,294 | Baker | Sept. 8, 1925 |
| 2,474,019 | Steiner et al. | June 21, 1949 |
| 2,487,698 | Diamond | Nov. 8, 1949 |